United States Patent [19]
Croteau

[11] Patent Number: 4,694,398
[45] Date of Patent: Sep. 15, 1987

[54] DIGITAL IMAGE FRAME PROCESSOR

[75] Inventor: Francis R. Croteau, Burlington, Mass.

[73] Assignee: Baird Corporation, Bedford, Mass.

[21] Appl. No.: 654,323

[22] Filed: Sep. 25, 1984

[51] Int. Cl.[4] .......................... G01T 1/29; G06F 15/52
[52] U.S. Cl. ..................................... 364/414; 378/901
[58] Field of Search .................. 364/414, 415; 378/21, 378/26, 4, 19, 901; 382/41, 42

[56] References Cited

U.S. PATENT DOCUMENTS

| 4,443,862 | 4/1984 | Buchner et al. | 364/415 |
| 4,491,932 | 1/1985 | Ruthmar et al. | 364/414 |
| 4,497,024 | 1/1985 | Roth | 378/901 |
| 4,504,909 | 3/1985 | Acharya et al. | 364/414 |
| 4,520,442 | 5/1985 | Grimberg et al. | 378/901 |
| 4,566,074 | 1/1986 | Nishikawa | 364/414 |

FOREIGN PATENT DOCUMENTS

| 0021365 | 7/1981 | European Pat. Off. | 364/414 |
| 83/00972 | 3/1983 | PCT Int'l Appl. | 378/21 |

Primary Examiner—Charles E. Atkinson
Assistant Examiner—Kim Thanh T. Bui
Attorney, Agent, or Firm—Morse, Altman & Dacey

[57] ABSTRACT

The present invention is provides a digital image or frame processor that improves pulse height resolution and eliminates post facto data correction. The calibration, acquisition, and correction of all scintillation data is performed in an array mode (20×20 data array; 20 word postamble) by this frame processor. To enhance speed, the control word is 48 bits wide to enable several functions to be performed in parallel. This frame processor incorporates bit slice computer technology in an arithmetic logic unit that cooperates with the other components of the system. In accordance with the present invention, this frame processor performs the following functions within the shortest data accumulation time of the camera, i.e. typically 10 milliseconds in the case of a gamma camera system: pulse height analysis settings for each detector; electrocardiogram digitization and recording; dual multiplexed buffer memory acquisition; field uniformity correction; background subtract correction; detector dead time correction; and radioactive decay correction. In consequence, this frame processor permits customized, narrower energy windows to be applied to individual channels in multi-crystal cameras (or to the regions of single crystal cameras). The result is radically improved digital array spectroscopy in real time.

11 Claims, 2 Drawing Figures

DIGITAL IMAGE FRAME PROCESSOR

BACKGROUND OF THE INVENTION

1. Field of the Invention

The present invention relates to image processing, and, more particularly, to the processing of sequential two dimensional images or frames that are produced digitally by an array of detectors utilizing radiography, ultrasound, or like media. For medical and other purposes, two dimensional visual images, or frames, may be produced digitally by associated arrays of detectors and transducers via radiography, ultrasound, or the like, from a subject being studied. Such images, for example, are produced by a digital camera system characterized by a mechanical array of digital detecting elements, a mechanical array of digital transducing elements, and, in effect, an electronic array of digital recording elements, all operating under suitable processing circuitry, control circuitry, and input/output circuitry. Such images ordinarily require corrections of various kinds and the present invention particularly pertains to the performance of such corrections. In order to facilitate an understanding of the present invention, the following description will refer to radiographic systems for consistency, although it is to be understood that ultrasound, and like media are contemplated herein.

2. Description of the Prior Art

One such radiographic system is a gamma camera in which the array of digital detecting elements includes crystal scintillators that detect the radioactivity distribution of a portion of a human body that has a diagnostic quantity of radioactive material, the array of digital transducing elements includes photomultiplier tubes that count gamma photon emissions, i.e. events, from the scintillators, and the array of digital recording elements is provided by a random access memory that is addressed by electronic signals representing digital pulse height information from the photomultiplier tubes. Typical of a system of this type has been the application of a single, all encompassing, pulse height energy setting that has been applied indiscriminately to all scintillators, and the application of data corrections that are made after the processing sequence has been completed. There is a need in such systems for increased energy resolution and decreased processing time.

SUMMARY OF THE INVENTION

The primary object of the present invention is to provide a digital image or frame processor that fills the aforementioned need by dramatically improving pulse height resolution and eliminating post facto data correction. The calibration, acquisition, and correction of all scintillation data is performed in an array mode (20×20 data array; 20 word postamble) by this frame processor. To enhance speed, the control word is 48 bits wide to enable several functions to be performed in parallel. This frame processor incorporates bit slice computer technology in an arithmetic logic unit that cooperates with the other components of the system. In accordance with the present invention, this frame processor performs the following functions within the shortest data accumulation time of the camera, i.e. typically 10 milliseconds in the case of a gamma camera system: pulse height analysis settings for each detector; electrocardiogram digitization and recording; dual multiplexed buffer memory acquisition; field uniformity correction; background subtract correction; detector dead time correction; and radio-active decay correction. In consequence, this frame processor permits customized, narrower energy windows to be applied to individual channels in multi-crystal cameras (or to the regions of single crystal cameras.) The result is radically improved digital array spectroscopy in real time.

Other objects of the present invention will in part be obvious and will in part appear hereinafter.

The invention accordingly comprises the apparatus, together with its parts and their interrelationships that are exemplified in the following disclosure, the scope of which will be indicated in the appended claims.

DESCRIPTION OF THE DRAWINGS

A fuller understanding of the nature and objects of the present invention will become apparent upon consideration of the following detailed description, taken in connection with the accompanying drawings, wherein.

DESCRIPTION OF THE PREFERRED EMBODIMENT

General

Figure 1:
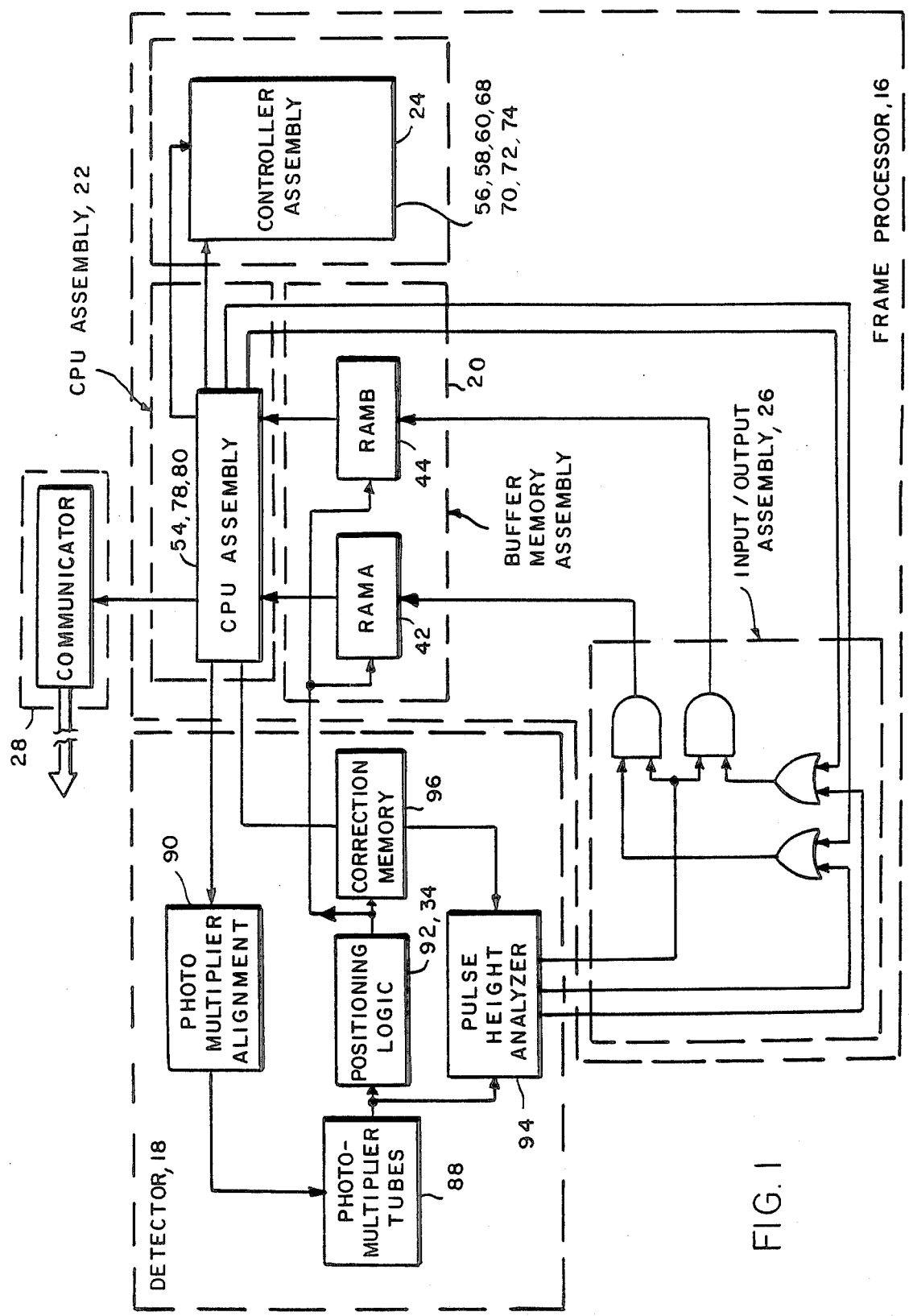
FIG. 1 is a block diagram of a frame processor of the present invention, in relation to a block diagram of a typical detector array, e.g. the radiographic detector array of a gamma camera.

The frame processor of the present invention comprises a number of circuits, which, in essence, constitute a very special purpose computer. This frame processor, generally indicated at 16 in FIG. 1, is designed to receive and to correct the sequential frames of digital images produced by the scintillators of a gamma camera, generally indicated at 18 in FIG. 1, of the type shown in U.S. patent application Ser. No. 369,654, filed Apr. 19, 1982, in the names of Johan A. Govaert and Joseph E. Town, which is incorporated hereinto by reference. In the present embodiment, the circuitry is designed for an 8"×8" array of scintillators which is not moved during imaging. When imaging the heart, for example, fixed position and orientation are required for each frame.

Figure 2:
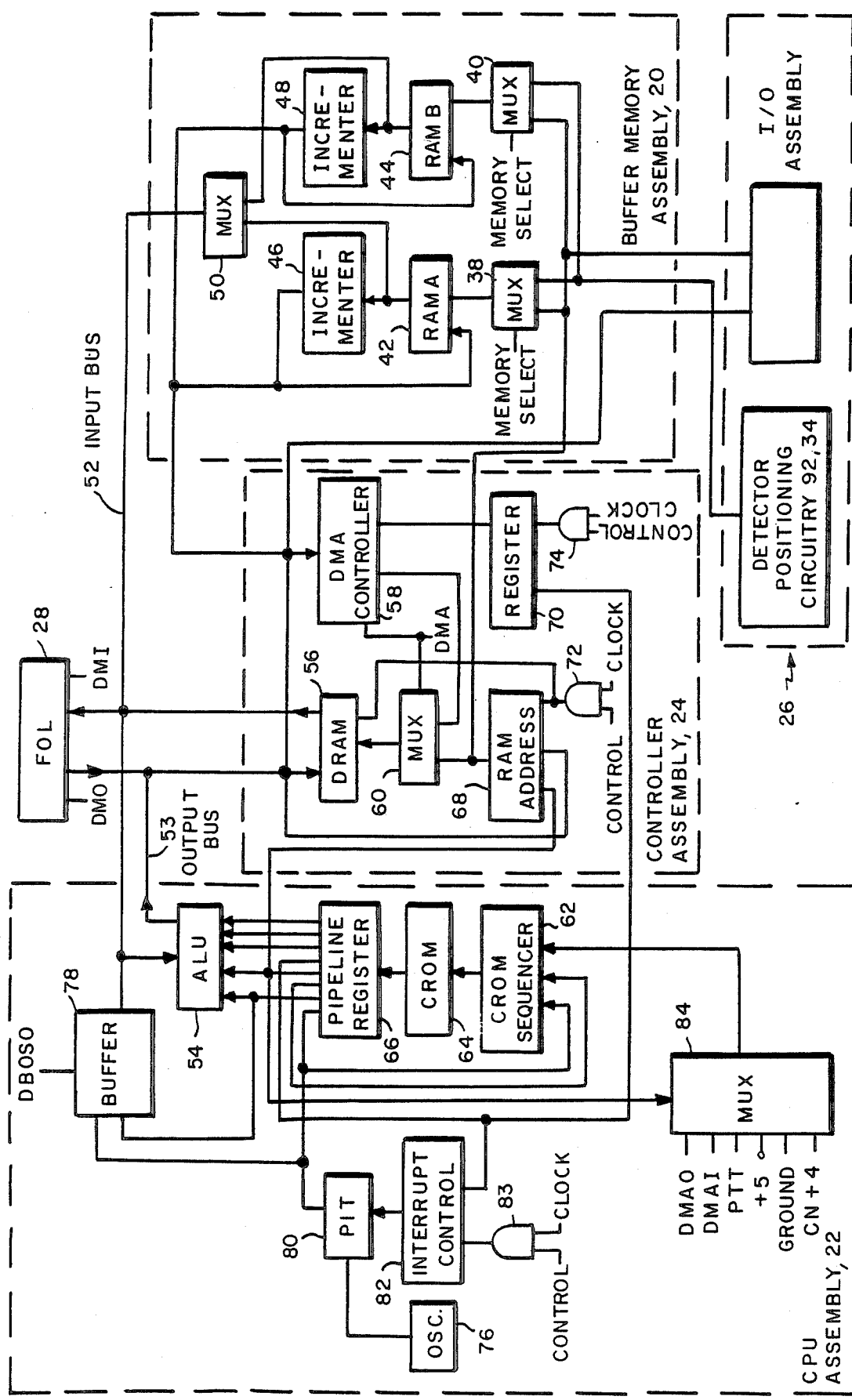
FIG. 2 is an electronic logic diagram of the frame processor of FIG. 1.

In rough blocks as shown in FIG. 1, frame processor 16 comprises a buffer memory assembly 20, a central processing unit (CPU) assembly 22, a controller (peripheral drivers) assembly 24, input/output (I/O) circuitry 26, and a communicator 28. From the standpoint of a conventional special purpose computer, the present very special purpose computer omits a front panel (fixed or virtual) that would allow continuing interfacing by an operator. Here, the front panel is fixed by hardware so that it always operates in the same sequence, even though that sequence is so complicated that it may not seem to be fixed. The components of the frame processor of the present invention now will be described in detail with reference to FIG. 2.

BUFFER MEMORY ASSEMBLY

Buffer memory assembly 20 includes a pair of multiplexers (MUX) 38 and (MUX) 40, one or the other of which receives the resulting signal from detector 18 on suitable address lines that are selected by controller assembly 24. One of MUX 38 and MUX 40, in operation, is enabled to apply the signal on the address lines of the detector to one or the other of a pair (A and B) of random access memories RAMA 42 and RAMB 44.

Buffer memory assembly 20 has two modes of operation. The first mode is a single isotope mode such that either RAMA 42 or RAMB 44 accumulates data from the detector during an assigned interval of time, while the other transmits data accumulated during the preceding assigned interval of time for processing and correction, one slice of the energy spectrum being examined at one time. The second mode is a dual isotope mode such that both RAMA 42 and RAMB 44 accumulate data during the same interval time and two slices of the energy spectrum are examined at one time. A multiplexer (MUX) 50 on command operatively connects one or the other of RAMA 42 and RAMB 44 to controller assembly 24 and CPU assembly 22. A pair of incrementers 46 and 48 are operable with RAMA 42 and RAMB 44 to increase any selected digital location by one count on the occurrence of any event. The dual isotope mode is such that RAMA 42 and RAMB 44 record where the event occurred and, also, in what window it occurred. In an alternative embodiment of the present invention, there are two or more random access memories of the type designated RAMA and RAMB herein for the recording of events in two or more slices of the energy spectrum. RAMA 42 and RAMB 44 are static random access memories having a 512 by 16 bit configuration, i.e. very fast memories that enable high count rates.

Controller Assembly

Controller assembly 24 includes a dynamic random access memory (DRAM) 56, refresh circuitry (not shown) to retain memory in DRAM 56, a random access memory (RAM) address circuit 68, a direct memory access (DMA) circuit 58 to enable fast access to or from DRAM 56, an associated 2/1 multiplexer 60, and associated peripheral circuitry. DRAM 56 is 65,536 words of 16 bits in length. The peripheral circuitry includes a 4 bit register 70, which defines the mode of operation of the DMA circuit 58. The peripheral circuitry also includes control gates 72 and 74, which determine when the output bus 53 or the pipeline register 66 data is fed to the ram address 68 or 4-bit register 70. DRAM 56 accepts the data readout of either RAMA 42 or RAMB 44. DRAM 56 also serves as a scratch pad to store the correction data arrays and intermediate data arrays while processing. In relation to the frame processor's rapid cycle time, for cost effectiveness, DRAM 56 is slow and requires multiple cycles for read and write processing. Control gate 74 applies control and function information to a 4 bit register 70 and instructs DMA controller 58 how to transfer the data from the memory.

Central Processing Unit Assembly

CPU assembly 22 includes an arithmetic logic unit (ALU) 54, a control read only memory (CROM) 64, a CROM sequencer 62, a pipeline register 66, a crystal controlled oscillator 76 that generates a four quadrant master clock, a buffer 78, a programmable interrupt timer (PIT) 80 responsive to a master clock generated by oscillator 76, an interrupt controller 82, 83, an 8/1 multiplexer (MUX) 84, and some diagnostic circuitry (not shown.)

ALU 54, in accordance with the present invention, is a bit slice assembly of 4 microprocessors of the type sold under the trade designation AM2901 by Advanced Micro Devices. ALU 54 performs all of the functions of the frame processor of the present invention. These are executed at a 250 nanosecond cycle time and perform multiplication of two 16 bit numbers in less than 5 microseconds. The wide (48 bit) word length enables many functions to be performed in parallel to provide the speed required in this processor. CROM sequencer 62 and CROM 64 operate to select and sequence the operations the hardware is going to perform. CROM 64, as shown, is a 1024 word by 48 bit memory such as that sold under the trade designation AM27S281 by Advanced Micro Devices. CROM sequencer 62, which operates a microprogram, as shown, is sold under the trade designation AM2910 by Advanced Micro Devices. Pipeline register 66 serves to expedite the flow of data in such a way as to process the data within it while getting ready for reception of the next batch of data from RAMA 42 or RAMB 44. In other words, pipeline register 66 permits the CROM address to be incremented while a prior CROM instruction is being executed. PIT 80, in the form of a 16 bit buffer, is designed around a timing control circuit such as that sold under the trade designation AM2942 by Advanced Micro Devices.

CPU assembly 22 also comprises LED driver circuitry (not shown) to indicate that assembly 22 and DMA controller 58 are operating, and an error indicator (not shown). The crystal controlled oscillator runs at 16 megahertz and establishes a four phase clock which produces a cycle time of 250 nanoseconds. The terminals of MUX 84 include a direct memory access out terminal DMAO, a direct memory access in terminal DMAI, a programmable interrupt timer (PIT) terminal, a +5 volt terminal, a ground terminal, and a CN terminal. The DMAO and DMAI terminals provide direct memory access out and in for FOL 28. The PIT terminal of MUX 84 is the control for PIT 80. The +5 volt terminal represents a ONE and the ground terminal represents a ZERO. The CN terminal carries one of the output functions from ALU 54, which enables a comparison of two words and a change of CROM address sequence depending on whether or not they compare.

Detector and Input/Output Circuitry and Fiber Optic Controller

I/O circuitry 26, in the illustrated embodiment, includes front end calibration circuitry (not shown), an electrocardiogram (ECG) interface (not shown), and a control panel interface (not shown.) Either one of RAMA 42 and RAMB 44 may be considered to be part of I/O circuitry 26 while it is connected for counting events during an assigned period of time. FOL 28 transfers 420 word blocks of data over a fiber optic cable to or from a data processing console. The ECG interface is an instrumentation amplifier and analog-to-digital converter. As shown in FIG. 1, the input to the frame processor is a 9 bit address signal and 1 bit ready signal that is applied via a ten line input to RAMA 42 and RAMB 44 by the detector logic of the gamma camera. This detector logic is shown as including a photomultiplier tube array 88, a photomultiplier alignment circuit 90 operatively connected to array 88, a positioning logic circuit 92, a pulse height analyzer circuit 94 to which the output of array 88 is applied, and a correction memory 96 to which the output of positioning logic circuit 92 is applied. The detector generates an address which corresponds to where in the array the event being processed occurred.

Relationships Among The Buffer Memory Assembly, The Controller Assembly and the Central Processing Unit Assembly Assuming single isotope operation, the frame processor disconnects RAMA 42 from the front end electronics at the end of the first accumulation interval. Then RAMB 44 is connected to accept the data from the front end electronics. The time required to switch from RAMA 42 to RAMB 44 or vice versa is less than 1 microsecond. At the start of the first accumulation interval, the frame processor commands RAMA 42 to accumulate the data being transmitted to it from detector 18. In this state, RAMA 42 addressing is from detector 18. If one of the photomultiplier tubes of photomultiplier array 88, in response to an event in the crystal array, generates a pulse that is accepted by pulse height analyzer 94, a READY pulse is sent to RAMA 42 and the data in the location being addressed is incremented. RAMA 42 thereafter will be ready to accept a new READY pulse from a new address within 500 nanoseconds.

As previously explained, in RAMA 42 and RAMB 44, each record location corresponds to a location of the crystal array and stores a count of the events that have occurred in that location of the crystal array. The output from either RAMA 42 or RAMB 44 is applied to either an incrementer 46 or an incrementer 48, respectively. The arrangement is such that, on the occurrence of each event at a particular location, the incrementer receives the accumulated count at that location from the corresponding RAMA 42 or RAMB 44 and stores that count incremented by ONE back in RAMA 42 or RAMB 44 at that location. The incrementers thus provide an electronic interpretation of any event that has been counted. The count then remains at its designated location in RAMA 42 or RAMB 44 until the next event at that location. In the first mode at the end of one time slice, the first of RAMA 42 and RAMB 44 contains the entire frame of data for one time period. At the end of that time slice, the second of RAMA 42 and RAMB 44 starts to receive the count information being transmitted by the detector. During that second time slice, the information in the then completed frame is transmitted from the first of RAMA 42 and RAMB 44 through MUX 50 via an input bus 52 to ALU 54 of CPU assembly 22. The information is transferred on 16 lines serially by word and parallel by bit. RAM address circuit 68 receives its input from either (1) output bus 53 or (2) pipeline register 66. The 4 bit register 70 tells DMA controller 58 what function to perform and whether to transfer data into or out of DRAM 56. The data from each memory address is sequentially loaded from RAMA 42 into ALU 54. The arrangement is such that the uncorrected data at any address in RAMA 42 and correcting data at a corresponding address in the efficiency correction array of DRAM 56 are loaded into ALU 54.

Also at the start of an accumulation interval, the frame processor commands PIT 80 to cause an interrupt after a time interval preselected by the operator. This time interval is selectable from 10 milliseconds to 32 seconds in 1 millisecond steps. PIT 80 is selectable by the frame processor in 1 microsecond steps from 1 to $(2^{16}-1)$ micro seconds for diagnostic purposes and is set at 1,000 for system operation. PIT 80 allows the system to load a programmable constant into CROM 64 for transmission to ALU 54. This programmable constant is a component of the algorithm for PIT 80 that is monitored by the frame processor to determine elapsed time for (1) stopping an accumulation in one of RAMB 42 and RAMA 44 and (2) switching to the other. In other words, interrupt controller 82 and PIT 80 allow the setting of any alternating time intervals that the operator selects empirically. The presently preferred time period is approximately 1 millisecond, which is fast enough to be accurate for cardiac studies and not so fast that it keeps the frame processor answering interrupts from the timer too frequently.

Calibration And Correction Arrays Of Digital Records

The frame processor of the present invention includes in its firmware the ability to create, store and process certain arrays of digital records, particularly, data arrays corresponding to the visual arrays of a sequence of radiographic images, and certain calibration and correction arrays corresponding to calibration and correction information generated during processing. For convenience in the following discussion, either RAMA 42 or RAMB 44, itself, will be described as having RAM arrays, and DRAM 56, itself, will be described as having DRAM arrays.

The following functions are performed by ALU 54 on uncorrected RAM data arrays. The data from each RAM location is sequentially loaded from the RAM location into ALU 54. This data is summed with all previous data in the RAM firmware to produce a double precision (32 bit) sum of all uncorrected data in the RAM at the same time that data from a corresponding address in the efficiency correction array is loaded into ALU 54. The efficiency correction array consists of data that ranges from 0.25 to 0.99 where 0.25 is the most efficient crystal and 0.99 are the least efficient. This array is generated by $cc(I)=c(max)/c(I)X4$, where $c(max)$ is the maximum count of any location in a uniform pool array, $c(I)$ is the $I^{th}$ location of the same array, and $cc(I)$ is the $I^{th}$ location of the efficiency corrected array. The RAM data is multiplied by the corresponding efficiency correction data to generate a 32 bit corrected result that contains a 20 bit whole number and a 12 bit decimal. The four most significant bits are assumed to be zero and are ignored. The remaining 16 bit whole number is rounded up if the 12 bit decimal is greater than 0.5 and the decimal then is dropped. The corrected result is stored in a DRAM array and also summed to all previous corrected data to form a double precision sum of all the corrected data within that frame.

The double precision uncorrected data and corrected data sums are converted to floating point numbers (1 sign bit, 7 value bits and 24 mantissa bits) by a firmware routine. The uncorrected sum is divided by the corrected sum to produce a floating point renormalization factor. The intent of this factor is to allow the corrected array to be renormalized so that the total count of the corrected data array is equal to that of the uncorrected data. The uncorrected sum is converted to a counts per second number which then is used to address a reference table that provides a dead time. The table is generated by the host computer and tailored for each particular system. The table consists of floating point numbers. The dead time correction factor and the renormalization factor are multiplied together to generate a combined floating point correction factor.

A partial isotope decay correction factor is calculated by the host computer and then used, along with the elapsed time, by the frame processor to calculate the final decay correction for the frame being corrected. This also is a floating point number and is multiplied by the previously found combined correction factor to produce a final correction constant.

Each data point from the intermediate array then is loaded into ALU 54 and multiplied by the combined correction factor. The corrected data is converted from floating point to 16 bit integer, background correction is performed by subtracting a background array, and this final data array is stored back into DRAM 56. The data is summed to produce a double precision total count for the corrected array. The data from each array address also is summed to the data from a corresponding sum or c-tot frame to generate a running sum of the study. This c-tot frame is used by the host computer to provide a live display. The data also is compared to the corresponding data from a c-max array. If the data is greater than that of the corresponding c-max data, the c-max array is updated with the new max and a corresponding "time" array is updated with the record number where the new maximum occurred.

This record number array later is used to determine the time c-max occurred by multiplying the record number by the time interval per frame. Thereafter DMA controller 58 is set to the first address of the corrected array and FOL 28 is commanded to transmit this data through FOL 28 to a host computer. The host computer then instructs frame processor 22 to transmit the c-tot array to the host computer after a selected number of frames. After each normal frame is transmitted, frame processor 22 checks the host request to determine if a c-tot transfer is required. If such a transfer is required, DMA controller 50 is set to command the transfer.

The correction procedure is such that deadtime, renormalization, and isotope decay constants are combined into one correction constant serving as a multiplication factor. That factor is applied at each location corresponding to a crystal location in DRAM 56, then the environmental background correction is performed. The information for this environmental background correction is in the form of an environmental background array which also is stored in DRAM 56. This environmental background data is loaded into ALU 54, subtracted from the current image data, and the final results are stored into DRAM 56. This correction procedure is effected for each of the 400 locations of the array in DRAM 56.

OPERATION 1.0 Calibration Functions 1.1 Vary high voltage on the photomultiplier tubes while monitoring photomultiplier tube pulse height output with a uniform pool to determine proper high voltage setting for each photomultiplier tube for any given isotope. This information is retained until a new calibration is performed or the host computer updates the array or the power is lost.

1.2 Determine photo peak of each crystal for a given uniform source and generate an array of numbers corresponding to the isotope spectrum for each crystal. This is performed once for either single or dual photopeaks sources. This data is retained as was the high voltage data.

1.3 Determine a uniformity correction array. An efficiency rating for each crystal. This is performed for each isotope if using dual photopeaks.

2.0 Correction Functions, Single Isotope.

2.1 Transmit data generated in procedure 1.1 to high voltage circuit and/or data from procedure 1.2 to a dynamic pulse height analyzer (not shown) if needed due to power failure, by which pulse height analyzer settings change, etc.

2.2 Enable one of two multiplexed buffer memories RAMA 42 or RAMB 44 accumulate data from detector positioning circuit (not shown).

2.3 Perform the following processing on whichever one of RAMA 42 and RAMB 44 is not accumulating data.

2.3.1 Uniformity correction. Correct the count in each crystal using the efficiency rating found in 1.3.

2.3.2 Normalize the array so the total count of the corrected array is equal to the total count of the uncorrected array.

2.3.3 Correct the data array for the system dead time error, a constant determined by the count rate.

2.3.4 Correct the data array for isotope decay error, a constant based on the type of isotope and elapsed time of the study.

2.3.5 Transmit the corrected data array plus total count, maximum count, etc. over FOL 28.

2.3.6 Sum the data array to produce an array equal to running sum.

2.3.7 Sum the data within the array to produce a total count of the array and store in an array postamble.

2.3.8 Find the maximum count in any array location and store the max in an array postamble.

2.3.9 Determine occurrence of the maximum count of each detector to produce an array that indicates the time of the peak.

2.4 The shortest time interval for one frame is ten milliseconds, which is selectable by the operator. Medical studies always are time limited because of the need to limit radiation exposure. On the other hand, counting too few events in a shorter time interval will result in information that is statistically inaccurate.

3.0 Correction Functions, Dual Isotope.

3.1 Transmit data from 1.1 to high voltage circuit and/or data from 1.2 to a dynamic pulse height analyzer (not shown) if needed.

3.2 Disable counting from both buffer memories RAMA 42 and RAMB 44.

3.3 Transfer data arrays from buffer memories RAMA 42 and RAMB 44 to the scratch pad memory in DRAM 56.

3.4 Enable both buffer memories RAMA 42 and RAMB 44 to accumulate data from the detector positioning circuitry (not shown in detail).

3.5 Perform processing from 2.3 on both arrays from 3.3.

3.6 The shortest time interval for dual isotope accumulation is 20 milliseconds.

What is claimed is:

1. A frame processor for images produced by a digital camera system characterized by an array of digital detecting means and an array of digital transducing means, said frame processor comprising:
    (a) buffer means including at least a buffer random access memory characterized by firmware arrays of buffer record means for operative connection to said array of digital detecting means and said array of digital transducing means;
    (b) controller means including a dynamic random access memory characterized by firmware arrays of dynamic record means operatively connected to said buffer means for association with said firmware arrays of buffer record means;
    (c) logic means including an arithmetic logic unit incorporating a bit slice arrangement of microprocessors operatively connected to said controller means for association with said firmware arrays of dynamic record means;

(d) said buffer record means being responsive to signals corresponding to software arrays of data representations and software arrays of correction representations from said digital detecting means and said digital transducing means in order to produce software arrays of initial buffer data;

(e) said dynamic record means being responsive to signals corresponding to said software arrays of initial buffer data to produce software arrays of initial dynamic data;

(f) said arithmetic logic unit being responsive to signals corresponding to said software arrays of initial dynamic data to produce software arrays of functionally transformed data;

(g) said dynamic record means being responsive to signals corresponding to said software arrays of functionally transformed data to produce software arrays of output dynamic data; and (h) said arithmetic logic unit and said dynamic random access memory of the controller means being responsive to signals corresponding to software arrays of output dynamic data to present software arrays of final image representations;

(i) said buffer means including a first random access memory means and a second random access memory means;

(j) wherein during a single given time interval said first random access memory means and said second random access memory means respond to signals corresponding to first software arrays of data representations and second software arrays of data representations from said digital detecting means and said digital transducing means.

2. A frame processor for images produced by a digital camera system characterized by an array of digital detecting means and an array of digital transducing means, said frame processor comprising:

(a) buffer means including at least a buffer random access memory characterized by firmware arrays of buffer record means for operative connection to said array of digital detecting means and said array of digital transducing means;

(b) controller means including a dynamic random access memory characterized by firmware arrays of dynamic record means operatively connected to said buffer means for association with said firmware arrays of buffer record means;

(c) logic means including an arithmetic logic unit incorporating a bit slice arrangement of microprocessors operatively connected to said controller means for association with said firmware arrays of dynamic record means;

(d) said buffer record means being responsive to signals corresponding to software arrays of data representations and software arrays of correction representations from said digital detecting means and said digital transducing means in order to produce software arrays of initial buffer data;

(e) said dynamic record means being responsive to signals corresponding to said software arrays of initial buffer data to produce software arrays of initial dynamic data;

(f) said arithmetic logic unit being responsive to signals corresponding to said software arrays of initial dynamic data to produce software arrays of functionally transformed data;

(g) said dynamic record means being responsive to signals corresponding to said software arrays of functionally transformed data to produce software arrays of output dynamic data;

(h) said arithmetic logic unit and said dynamic random access memory of the controller means being responsive to signals corresponding to software arrays of output dynamic data to present software arrays of final image representations;

(i) said buffer means including a first random access memory means and a second random access memory means;

(j) wherein during a single given time interval said first random access memory means and said second random access memory means respond to signals corresponding to first software arrays of data representations and second software arrays of data representations from said digital detecting means and said digital transducing means; and (k) wherein said frame processor includes programmable interrupt timer means for controlling said time interval.

3. A frame processor for images produced by a digital camera system characterized by an array of digital detecting means and an array of digital transducing means, said frame processor comprising:

(a) buffer means including at least a buffer random access memory characterized by firmware arrays of buffer record means for operative connection to said array of digital detecting means and said array of digital transducing means;

(b) controller means including a dynamic random access memory characterized by firmware arrays of dynamic record means operatively connected to said buffer means for association with said firmware arrays of buffer record means;

(c) logic means including an arithmetic logic unit incorporating a bit slice arrangement of microprocessors operatively connected to said controller means for association with said firmware arrays of dynamic record means;

(d) said buffer record means being responsive to signals corresponding to software arrays of data representations and software arrays of correction representations from said digital detecting means and said digital transducing means in order to produce software arrays of initial buffer data;

(e) said dynamic record means being responsive to signals corresponding to said software arrays of initial buffer data to produce software arrays of initial dynamic data;

(f) said arithmetic logic unit being responsive to signals corresponding to said software arrays of initial dynamic data to produce software arrays of functionally transformed data;

(g) said dynamic record means being responsive to signals corresponding to said software arrays of functionally transformed data to produce software arrays of output dynamic data;

(h) said arithmetic logic unit and said dynamic random access memory of the controller means being responsive to signals corresponding to software arrays of output dynamic data to present software arrays of final image representations;

(i) wherein control read only memory means and control read only memory sequencer means are operatively connected to select and to sequence the flow of data among said buffer record means, said dynamic random access memory and said arithmetic logic unit.

4. A frame processor comprising;
(a) a buffer memory assembly;
(b) a central processing unit (CPU) assembly;
(c) a controller assembly;
(d) input/output (I/O) circuitry;
(e) said buffer memory assembly including a pair of multiplexers (MUXA) and (MUXB) and a pair of random access memories (RAMA) and (RAMB), at least one of said RAMA and said RAMB being for operative connection through at least one of said MUXA and MUXB to a detector for reception of an original array of data;
(f) said controller assembly including a dynamic random access memory (DRAM), a random access memory address (RAM ADDRESS) circuit, and a direct memory access (DMA) circuit, said DRAM being operatively connected for receiving signals from RAMA and RAMB to serve as a scratch pad for storage of intermediate data arrays and correction data arrays during processing, said DMA and said RAM ADDRESS being operatively connected to control the selection of addresses in said DRAM;
(g) said CPU assembly including an arithmetic logic unit (ALU), a control read only memory (CROM), a CROM sequencer (CROM), a pipeline register, a crystal controlled oscillator that generates a master clock, and a programmable interrupt timer (PIT), said CROM sequencer and said CROM being operatively connected to select and to sequence the flow of data among said RAMA, RAMB, DRAM, and ALU, said pipeline register being operatively connected to permit a second CROM address to be accessed while a first CROM address is being executed, said PIT being operatively connected to cause an interrupt after a time interval preselected by the operator;
(h) wherein all arithmetic functions are performed by said ALU on uncorrected RAM data arrays, the RAM data from each RAM address being sequentially loaded from said RAM into said ALU, said data being summed with all previous data in said RAM to produce a double precision (32 bit) sum of all uncorrected data in said RAM at the same time that data from a corresponding address in an efficiency correction array is loaded into said ALU, said last mentioned data including data that ranges from 0.25 to 0.99 where 0.25 is the most efficient crystal and 0.99 are the least efficient, said last mentioned array having been generated by:

$$cc(I) = c(max)/c(I) \times 4,$$

c(max) being the maximum count of any location in a uniform pool array, c(I) being the $I^{th}$ location of the same array and cc(I) being the $I^{th}$ location of the efficiency corrected array;
(j) the RAM data being multiplied by the corresponding efficiency correction data to generate a 32 bit corrected result that contains a 20 bit whole number and 12 bit decimal, certain of the most significant bits being assumed to be zero and being ignored, the remaining 16 bit whole number being rounded off, the corrected resulting data being stored in said DRAM and being summed with previous corrected data to form a precision sum of corrected data.

5. The frame processor of claim 4 wherein said precision uncorrected data and corrected data sums are converted to floating point numbers by said ALU, the uncorrected sum being divided by the corrected sum to produce a floating point renormalization factor, said last mentioned factor being to allow the corrected array to be renormalized so that the total count of the corrected data array is equal to that of the uncorrected data.

6. The frame processor of claim 5 wherein said uncorrected sum is converted to a counts per second number which is then used to address a reference table which provides dead time correction data, said table consisting of floating point numbers, said dead time correction factor and the renormalization factor being multiplied together to generate a combined floating point correction factor.

7. A frame processor for operation with a host computer, said frame processor comprising;
(a) a buffer memory assembly;
(b) a central processing unit (CPU) assembly;
(c) a controller assembly; and
(d) input/output (I/O) circuitry;
(e) said buffer memory assembly including a pair of multiplexers (MUXA) and (MUXB) and a pair of random access memories (RAMA) and (RAMB), at least one of said RAMA and said RAMB being for operative connection through at least one of said MUXA and MUXB to a detector for reception of an original array of data;
(f) said controller assembly including a dynamic random access memory (DRAM), a random access memory address (RAM ADDRESS) circuit, and a direct memory access (DMA) circuit, said DRAM being operatively connected for receiving signals from RAMA and RAMB to serve as a scratch pad for storage of intermediate data arrays and correction data arrays during processing, said DMA and said RAM ADDRESS being operatively connected to control the selection of addresses in said DRAM;
(g) said CPU assembly including an arithmetic logic unit (ALU), a control read only memory (CROM), a CROM sequencer (CROM), a pipeline register, a crystal controlled oscillator that generates a master clock, and a programmable interrupt time (PIT), said CROM sequencer and said CROM being operatively connected to select and to sequence the flow of data among said RAMA, RAMB, DRAM, and ALU, said pipeline register being operatively connected to permit a second CROM address to be accessed while a first CROM address is being executed, said PIT being operatively connected to cause an interrupt after a time interval preselected by the operator.
(g) wherein a partial isotope decay correction factor is calculated by the host computer and then used along with the elapsed time, by the frame processor to calculate the final decay correction for the frame being corrected, said last mentioned factor being a floating point number for multiplication by the previously found combined correction factor to produce a final correction constant.

8. The frame processor of claim 7 wherein data from said intermediate array is then loaded into said ALU and multiplied by said combined correction factor to produce a final data array, said corrected data being converted from floating point to 16 bit integer and stored back into said DRAM.

9. The frame processor of claim 8 wherein said DMA controller commands the transfer for conversion to visual observation.

10. A frame processor comprising;
   (a) a buffer memory assembly;
   (b) a central processing unit (CPU) assembly;
   (c) a controller assembly; and
   (d) input/output (I/O) circuitry;
   (e) said buffer memory assembly including a pair of multiplexers (MUXA) and (MUXB) and a pair of random access memories (RAMA) and (RAMB), at least one of said RAMA and said RAMB being for operative connection through at least one of said MUXA and MUXB to a detector for reception of an original array of data;
   (f) said controller assembly including a dynamic random access memory (DRAM), a random access memory address (RAM ADDRESS) circuit, and a direct memory access (DMA) circuit, said DRAM being operatively connected for receiving signals from RAMA and RAMB to serve as a scratch pad for storage of intermediate data arrays and correction data arrays during processing, said DMA and said RAM ADDRESS being operatively connected to control the selection of addresses in said DRAM;
   (g) said CPU assembly including an arithmetic logic unit (ALU), a control read only memory (CROM), a CROM sequencer (CROM), a pipeline register, a crystal controlled oscillator that generates a master clock, and a programmable interrupt time (PIT), said CROM sequencer and said CROM being operatively connected to select and to sequence the flow of data among said RAMA, RAMB, DRAM, and ALU, said pipeline register being operatively connected to permit a second CROM address to be accessed while a first CROM address is being executed, said PIT being operatively connected to cause an interrupt after a time interval preselected by the operator;
   (h) wherein the correction procedure is such that deadtime, renormalization, and isotope decay constants are combined into one correction constant that is loaded into said ALU as a multiplication factor at a plurality of addresses of said DRAM.

11. A frame processor for images produced by a digital camera system characterized by an array of digital detecting means and an array of digital transducing means, said frame processor comprising:
   (a) buffer means including at least a random access memory A(RAMA) and a random access memory B(RAMB) characterized by firmware arrays of buffer record means for operative connection to said array of digital detecting means and said array of digital transducing means;
   (b) controller means including a dynamic random access memory characterized by firmware arrays of dynamic record means operatively connected to said buffer means for association with said firmware arrays of buffer record means;
   (c) logic means including an arithmetic logic unit incorporating a bit slice arrangement of microprocessors operatively connected to said controller means for association with said firmware arrays of dynamic record means;
   (d) said buffer record means being responsive to signals corresponding to software arrays of data representations and software arrays of correction representations from said digital detecting means and said digital transducing means in order to produce software arrays of initial buffer data;
   (e) said dynamic record means being responsive to signals corresponding to said software arrays of initial buffer data to produce software arrays of initial dynamic data;
   (f) said arithmetic logic unit being responsive to signals corresponding to said software arrays of initial dynamic data to produce software arrays of functionally transformed data;
   (g) said dynamic record means being responsive to signals corresponding to said software arrays of functionally transformed data to produce software arrays of output dynamic data;
   (h) said arithmetic logic unit and said dynamic random access memory of the controller means being responsive to signals corresponding to software arrays of output dynamic data to present software arrays of final image representations;
   (i) control read only memory means and control read only memory sequencer means are operatively connected to select and to sequence the flow of data among said buffer record means, said dynamic random access memory and said arithmetic logic unit;
   (j) wherein the buffer means has two modes of operation, the first mode being a single isotope mode such that said buffer means accumulates data from said detector during an assigned period of time, the second mode transmitting data accumulated during a preceding assigned period of time for processing and correction, one slice of the energy spectrum being examined at one time, said second mode being a dual isotope mode such that both said RAMA and said RAMB accumulate data at the same time and two slices of the energy spectrum are examined at once.

* * * * *